(12) United States Patent
Zhong et al.

(10) Patent No.: US 12,169,471 B2
(45) Date of Patent: *Dec. 17, 2024

(54) MANAGING DATASETS GENERATED BY SEARCH QUERIES

(71) Applicant: Splunk Inc., San Francisco, CA (US)

(72) Inventors: Qianjie Zhong, Shanghai (CN); Ting Wang, Shanghai (CN); Margaret Lee, Dublin, CA (US); Dawei Li, Shanghai (CN); Nick Filippi, Atherton, CA (US); Yue Ni, Shanghai (CN); Shiming Yuan, Shanghai (CN)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,156

(22) Filed: Feb. 10, 2022

(65) Prior Publication Data

US 2022/0171736 A1    Jun. 2, 2022

Related U.S. Application Data

(63) Continuation of application No. 16/777,357, filed on Jan. 30, 2020, now Pat. No. 11,288,231, which is a
(Continued)

(51) Int. Cl.
 *G06F 16/11*   (2019.01)
 *G06F 11/07*   (2006.01)
(Continued)

(52) U.S. Cl.
 CPC ........ *G06F 16/125* (2019.01); *G06F 11/0727* (2013.01); *G06F 11/0775* (2013.01);
(Continued)

(58) Field of Classification Search
 None
 See application file for complete search history.

(56) References Cited

U.S. PATENT DOCUMENTS

| 7,984,034 B1 | 7/2011 | Shaw |
| 9,578,046 B2 * | 2/2017 | Baker ................. H04L 63/1416 |

(Continued)

OTHER PUBLICATIONS

Klopp, Rob, "Dynamic Late Binding Schemas on Need"; Database Fog Blog; published Apr. 3, 2014; retrieved on Sep. 3, 2016 from https://skylandtech.net/2014/04/03/dynamic-late-binding-schemas-on-need/.

(Continued)

*Primary Examiner* — Alex Gofman
*Assistant Examiner* — Umar Mian
(74) *Attorney, Agent, or Firm* — Shook, Hardy & Bacon L.L.P.

(57) ABSTRACT

An example method for managing datasets produced by alert-triggering search queries may include producing a dataset by executing a search query on a portion of data associated with a time window defined relative to a current time. The method may further include responsive to determining that a portion of the dataset satisfies a condition defining an alert, generating an instance of the alert. The method may further include associating, by a memory data structure, the instance of the alert with an identifier of the query and a parameter specifying a time of execution of the query that has triggered the instance. The method may further include receiving a request for the dataset portion. The method may further include substituting, in a definition of the time window, the current time with the time parameter. The method may further include reproducing the dataset portion by re-executing the query using the time window.

20 Claims, 11 Drawing Sheets

Related U.S. Application Data continuation of application No. 15/461,076, filed on Mar. 16, 2017, now Pat. No. 10,585,851, which is a continuation of application No. 14/396,367, filed as application No. PCT/CN2014/081910 on Jul. 9, 2014, now abandoned.

(51) Int. Cl.
*G06F 16/16* (2019.01)
*G06F 16/245* (2019.01)
*G06F 16/2455* (2019.01)
*G06F 16/2458* (2019.01)
*G06F 16/25* (2019.01)
*G06F 16/9535* (2019.01)
*G08B 21/18* (2006.01)

(52) U.S. Cl.
CPC ......... *G06F 16/162* (2019.01); *G06F 16/245* (2019.01); *G06F 16/2455* (2019.01); *G06F 16/24565* (2019.01); *G06F 16/2477* (2019.01); *G06F 16/254* (2019.01); *G06F 16/9535* (2019.01); *G08B 21/18* (2013.01)

(56) References Cited

U.S. PATENT DOCUMENTS

| | | | |
|---|---|---|---|
| 10,585,851 | B2 | 3/2020 | Zhong et al. |
| 2005/0044063 | A1 | 2/2005 | Barsness et al. |
| 2006/0048025 | A1 | 3/2006 | Filipovic |
| 2006/0143034 | A1* | 6/2006 | Rothermel ............ G06Q 10/10 705/301 |
| 2007/0100836 | A1 | 5/2007 | Eichstaedt et al. |
| 2007/0222589 | A1* | 9/2007 | Gorman ................. G06Q 10/00 709/223 |
| 2007/0255744 | A1 | 11/2007 | Gideoni et al. |
| 2008/0263009 | A1* | 10/2008 | Buettner ........... G06F 16/90335 707/E17.14 |
| 2008/0319991 | A1 | 12/2008 | Ross |
| 2009/0031006 | A1 | 1/2009 | Johnson |
| 2010/0198563 | A1 | 8/2010 | Plewe |
| 2011/0119100 | A1* | 5/2011 | Ruhl ..................... G06Q 10/06 705/7.11 |
| 2011/0153662 | A1 | 6/2011 | Stanfill et al. |
| 2011/0161316 | A1* | 6/2011 | Jeh ....................... G06F 16/9535 707/723 |
| 2012/0117079 | A1 | 5/2012 | Baum et al. |
| 2012/0137367 | A1 | 5/2012 | Dupont et al. |
| 2013/0226905 | A1 | 8/2013 | Chamberlain et al. |
| 2013/0318603 | A1 | 11/2013 | Merza |
| 2014/0095540 | A1 | 4/2014 | Hsiao et al. |
| 2015/0339707 | A1 | 11/2015 | Harrison et al. |
| 2015/0363694 | A1 | 12/2015 | Banerjee et al. |
| 2016/0147830 | A1 | 5/2016 | Zhong et al. |
| 2016/0154855 | A1 | 6/2016 | Hsiao et al. |
| 2020/0167311 | A1 | 5/2020 | Zhong et al. |

OTHER PUBLICATIONS

International Search Report and The Written Opinion of the International Searching Authority for the International Patent Application No. PCT/CN2014/081910, mailed Jun. 2, 2016, 12 pages.

* cited by examiner

```
Original Search: 501
search error | stats count BY host

Sent to peers: 502
search error | prestats count BY host

Executed by search head: 503
Merge prestats results received from peers (reduce)
```

FIG. 8

MANAGING DATASETS GENERATED BY SEARCH QUERIES

RELATED APPLICATIONS

This application is a continuation of U.S. patent application Ser. No. 16/777,357 filed on Jan. 30, 2020, which is a continuation of U.S. patent application Ser. No. 15/461,076 filed on Mar. 16, 2017, and issued as U.S. Pat. No. 10,585, 851 on Mar. 10, 2020, which is a continuation of U.S. patent application Ser. No. 14/396,367 filed on Jan. 28, 2016, which is the U.S. National Stage Application of International Application No. PCT/CN2014/081910, filed on Jul. 9, 2014. The above-referenced applications are incorporated by reference herein in their respective entireties.

TECHNICAL FIELD

The present disclosure is generally related to data aggregation and analysis systems, and is more specifically related to alerting mechanisms employed by data aggregation and analysis systems.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 8 illustrates an exemplary search query received from a client and is executed by search peers in accordance with the disclosed embodiments.

DETAILED DESCRIPTION

Figure 1:
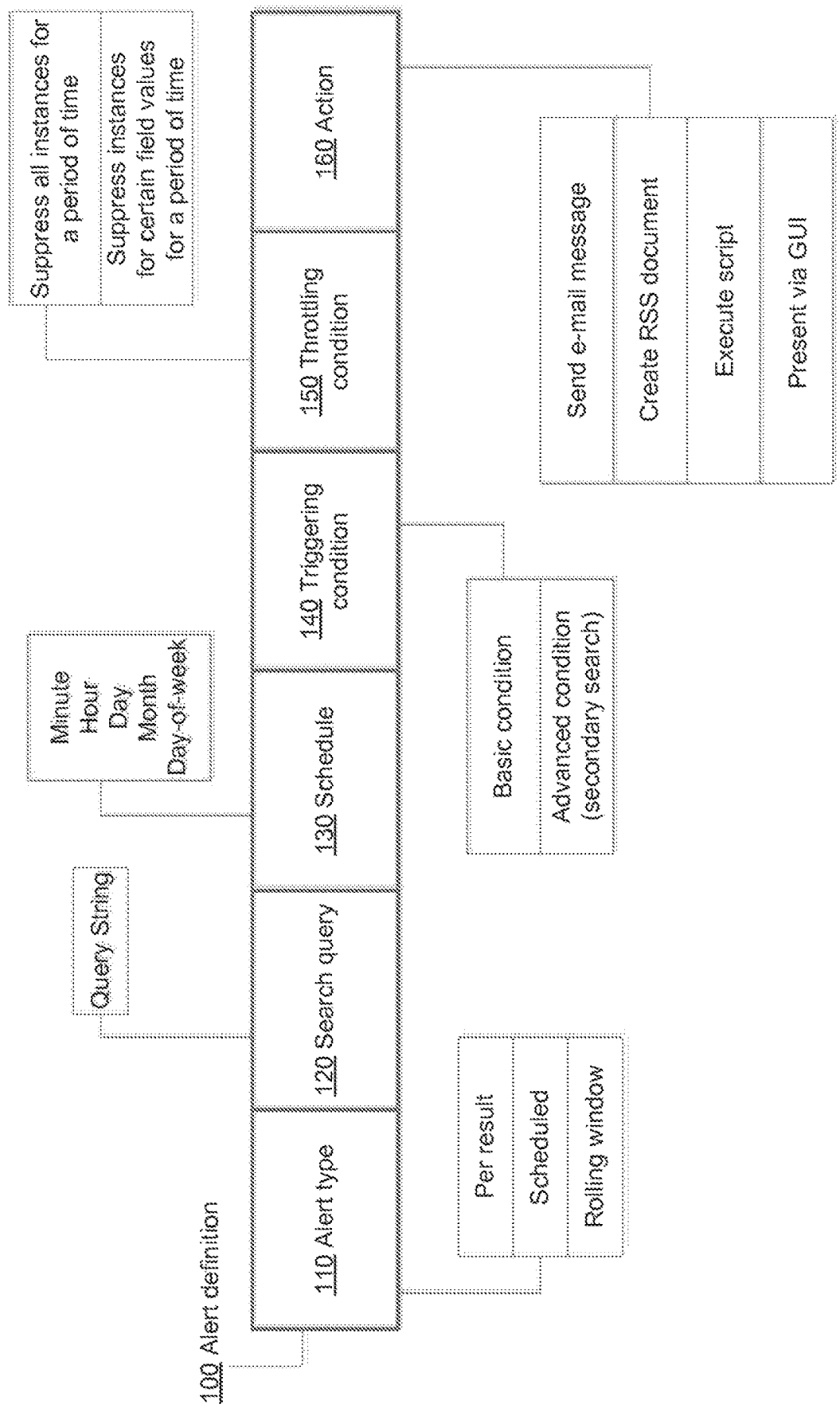
FIG. 1 schematically illustrates an example data structure that may be utilized by the systems and methods described herein for defining alerts in accordance with one or more aspects of the present disclosure.

Disclosed herein are systems and methods for managing datasets produced by alert-triggering search queries in data aggregation and analysis systems.

An example data aggregation and analysis system may aggregate heterogeneous machine-generated data received from various sources, including servers, databases, applications, networks, etc. The aggregated source data may comprise a plurality of events. An event may be represented by a data structure that is associated with a certain point in time and comprises a portion of raw machine-generated data. The system may be configured to perform real-time indexing of the source data and to execute real-time, scheduled, or historic searches on the source data.

The data aggregation and analysis system may provide an alerting mechanism to trigger certain actions in response to an occurrence of certain conditions. An alert may be defined by a triggering condition applied to a data set produced by a search query that is executed by the system either in real time or according to a certain schedule. An alert instance may be triggered when at least a portion of the dataset returned by the search satisfies the triggering condition, as described in more details herein below.

Responsive to triggering an alert instance, the system may perform one or more actions associated with the alert, such as sending an email message to certain recipients, creating a Really Simple Syndication (RSS) feed, executing a certain script, and/or presenting the alert instance via a graphical user interface (GUI) of a client computing device. In various illustrative examples, the system may present alert instances on a client computing device (e.g., a desktop computing device or a mobile computing device).

In certain implementations, responsive to triggering an alert instance, the system may store, in a storage memory, a portion of the dataset that has triggered the alert instance. The system may associate (e.g., by a memory data structure) the instance of the alert with an identifier of the portion of the dataset stored in the memory.

The system may allow a user to "drill down" to the underlying data that has triggered a particular alert instance: a user may request (e.g., via a GUI associated with the client computing device) the portion of the dataset that has triggered the alert instance. Responsive to receiving the request, the system may retrieve, from the storage memory, the portion of the dataset associated with the alert instance and present it to the requestor.

As the disk space allocated for the files storing the datasets produced by alert-triggering search queries may be limited, the system may implement a file retention policy with respect to such files. In an illustrative example, a file may be deleted upon expiration of a certain time since the time of the file creation. Alternatively, one or more least recently created, accessed or modified files may be deleted responsive to determining that the free disk space falls below a certain threshold value.

Thus, requesting the portion of the dataset associated with a particular alert instance may trigger an irrecoverable error condition if the portion of the dataset has been deleted in accordance with a file retention policy. To provide a recovery mechanism in the above described scenario, an example data aggregation and analysis system may, at the time when an alert is triggered, store, in a memory, the search query associated with the alert and a time parameter associated with the instance of the alert. The time parameter may define a point in time (e.g., using POSIX time represented by number of seconds that have elapsed since 00:00:00 Coordinated Universal Time (UTC), Thursday, 1 Jan. 1970) of executing a search query that has triggered the alert instance, and/or an absolute time range associated with the search query that has triggered the alert instance. Alternatively, the time parameter may define the time range of data searched using the query that resulted in meeting the trigger condition, where the data is time-series data.

Later, when a user requests the alert triggering dataset, the system may determine whether the portion of the dataset is stored in the storage memory. Responsive to successfully retrieving, from the storage memory, the portion of the dataset identified by the dataset identifier associated with the alert instance, the system may return the dataset to the requestor. Otherwise, responsive to determining that the portion of the dataset is not stored in the storage memory, the system may, transparently for the requestor, re-execute the search query using the stored alert time or the time window, and return the relevant portion of the dataset to the requestor.

In certain implementations, a dataset that has been recreated by the above described procedure responsive to a client request, may be stored in the storage memory subject to the general or a shortened file retention policy.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

As noted herein above, an example data aggregation and analysis system may be configured to perform real-time indexing of the source data and to execute real-time, scheduled, or historic searches on the source data. A search query may comprise one or more search terms. Search terms may include keywords, phrases, Boolean expressions, regular expressions, field name-value pairs, etc. In certain implementations, the data aggregation and analysis system may produce a plurality of data items from the source data in a reverse chronological order, in order to optimize search operations on more recent data. The data aggregation and analysis system may apply a filter specifying relative (with respect to a certain point in time) or absolute (e.g., POSIX) time values, to filter the dataset produced by the search by a specific time value or a specific time window.

The data aggregation and analysis system may provide an alerting mechanism to trigger certain actions in response to occurrences of certain conditions. An alert may be associated with a search query that is executed by the system either in real time or according to a certain schedule. An alert instance may be triggered when at least a portion of the resulting dataset produced by the search meet a triggering condition defining the alert, as described in more details herein below.

In certain implementations, alerts may be classified into several categories based on the search execution mode and/or the type of the triggering condition associate with an alert. In an illustrative example, alerts may be categorized as "per result" alerts, scheduled alerts, or rolling window alerts.

A "per result" alert may be based on a real-time search (e.g., repeatedly executed by a certain process or thread in an indefinite loop which may be interrupted by occurrences of certain terminating conditions). A "per result" alert instance may be triggered whenever the search associated with the alert returns a data item (e.g., an event, or a data item of another type). In other words, an alert instance is triggered for each result returned by the search query. Thus, evaluating a triggering condition for a "per result" alert may comprise determining that the dataset produced by executing the search query associated with the alert comprises at least one data item. "Per result" alert type may be utilized for triggering one or more actions to be performed within a short period of time of a matching search result being detected. In an illustrative example, a "per result" alert instance may be triggered responsive to detecting every failed login attempt. In another illustrative example, a "per result" alert instance may be triggered responsive to detecting a "file system full" error on any host.

A "scheduled" alert may be based on a search that runs according to a certain configurable schedule. A configurable schedule may comprise one or more values of minute, hour, day, month, and/or day-of-week. A "scheduled" alert instance may be triggered whenever the dataset produced by executing the search query associated with the alert satisfies a certain triggering condition. The search schedule may include criteria for searching data only within a specified time period relative to when the search is performed. Thus, the same search query may produce different results when run (according to the schedule) at different times.

In an illustrative example, evaluating a triggering condition may comprise comparing the number of data items in the dataset produced by executing the search query associated with the alert to a certain configurable integer value. In an illustrative example, an alert instance may be triggered whenever the number of data items in the dataset produced by executing the search query associated with the alert is greater then, less then, or equal to a certain configurable integer value.

In another illustrative example, evaluating a triggering condition may comprise performing a secondary search on the dataset produced by executing the search query associated with the alert. If a triggering condition is utilized for defining a "scheduled" alert, an alert instance is triggered whenever the secondary search returns any results.

In an illustrative example, a "scheduled" alert instance may be triggered responsive to determining that the number of "404—Object not found" errors in any given one hour time interval exceeds 100. In another illustrative example, a "scheduled" alert instance may be triggered responsive to determining that the number of items sold in the previous day is less than 500. "Scheduled" alert instances may be throttled as described in more details herein below.

A "rolling window" alert may be based on a real-time search (e.g., repeatedly executed by a certain process or thread in an indefinite loop which may be interrupted by occurrences of certain terminating conditions) that monitors data (such as events) within a rolling time window. The rolling time window may be defined relative to the "current time" moment, e.g., between "current time" and 15 minutes to "current time." A "rolling window" alert instance may be triggered whenever the search criteria and the triggering condition are met when applied to the data within a rolling window.

In an illustrative example, evaluating a triggering condition may comprise comparing the number of data items in the dataset produced by executing the search query associated with the alert to a certain configurable integer value. In an illustrative example, an alert instance may be triggered whenever the number of data items in the dataset produced by executing the real-time search query that monitors events within a rolling time window associated with the alert is greater then, less then, or equal to a certain configurable integer value.

In another illustrative example, evaluating a triggering condition may comprise performing a secondary search on the dataset produced by executing the real-time search query that monitors events within a rolling time window associated with the alert. An alert instance may be triggered whenever the secondary search returns any results.

The "rolling window" alert type may be utilized for triggering one or more actions responsive to events occurring within a rolling time window of a configurable width. In an illustrative example, a "rolling window" alert instance may be triggered responsive to detecting three consecutive login attempts by a user within ten minutes immediately before the current time. In another illustrative example, a "rolling window" alert instance may be triggered responsive to determining that a host could not complete a file transfer operation within the hour immediately before the current time. "Rolling window" alert instances may be throttled as described in more details herein below.

An alert definition may comprise one or more actions to be performed by the system responsive to triggering an instance of the alert. In an illustrative example, an action associated with an alert may comprise sending an e-mail message to certain recipients. The system may insert into the e-mail message at least a portion of the dataset that has triggered the alert instance. In another illustrative example, an action associated with an alert may comprise creating an RSS feed including at least a portion of the dataset that has triggered the alert instance. In another illustrative example, an action associated with an alert may comprise executing a shell script that can perform various actions (e.g., sending a Simple Network Management Protocol (SNMP) trap notification or calling an Application Programming Interface (API) function). In another illustrative example, an action associated with an alert may comprise presenting the alert via a GUI of a client computing device.

In certain implementations, an alert definition may comprise a rule specifying whether the actions associated with the alert should be performed for each data item in the dataset produced by executing the search query associated with the alert, or once for all data items comprised by the dataset. In an illustrative example, a search query may be configured to return user names identifying the users that had over three consecutive failed login attempts within a specified period of time. A definition of an alert associated with the search query may specify that the action associated with the alert (e.g., executing a script to disable the affected user account) should be performed for each data item in the dataset produced by executing the search query. Alternatively, the alert definition may specify that the action associated with the alert (e.g., sending an e-mail message to a system administrator) should be performed for all data items in the dataset produced by executing the search query.

In certain implementations, triggering an alert instance may be suppressed by a throttling condition. In an illustrative example, an alert definition may comprise a throttling condition to suppress triggering alert instances for a certain period of time following a previous instance of the alert.

Alternatively, an alert definition may comprise a throttling condition to suppress, for a certain period of time, triggering alert instances for certain data items (e.g., defined by field name-value pairs) in the dataset produced by executing the search query. For example, a throttling condition may be defined to suppress for one hour triggering alert instances for failed login attempts by the same user.

FIG. 1 schematically illustrates an example data structure that may be utilized by the systems and methods described herein for defining alerts in accordance with one or more aspects of the present disclosure. As schematically illustrated by FIG. 1, an alert definition 100 may comprise an alert type 110, a search query 120, a schedule 130, a triggering condition 140, a throttling condition 150, and one or more actions 160. It should be noted that an alert definition 100 may include more, less or different alert characteristics than those shown in FIG. 1.

In various illustrative examples, alert type 110 may be represented by "per result," "scheduled," or "rolling window" alerts, as described in more details herein above.

Search query 120 may be represented by a search query string comprising one or more search terms. The search query string may satisfy to the syntax of a certain query language supported by the data aggregation and retrieval systems.

Schedule 130 may be represented by a data structure comprising values of one or more scheduling parameters (e.g., minute, hour, day, month, and/or day-of-week).

Triggering condition 140 may comprise comparing the number of data items in the dataset produced by executing the search query associated with the alert to a certain configurable integer value. In another illustrative example, triggering condition 140 may comprise a secondary search on the dataset produced by executing the search query associated with the alert, as described in more details herein above.

Throttling condition 150 may be utilized to suppress triggering certain alert instances. In an illustrative example, a throttling condition may be used to suppress triggering alert instances for a certain period of time following a previous instance of the alert. Alternatively, an alert definition may comprise a throttling condition to suppress, for a certain period of time, triggering alert instances for certain data items in the dataset produced by executing the search query, as described in more details herein above.

Action 160 may specify one or more actions to be performed by the system responsive to triggering an instance of the alert. The actions may include, for example, sending an e-mail message to certain recipients, creating an RSS feed including at least part of the dataset that has triggered the alert instance, executing a shell script, and/or presenting the alert via a GUI of a client computing device, as described in more details herein above.

In certain implementations, responsive to triggering an alert instance, the system may store, in a storage memory, a portion of the dataset that has triggered the alert instance, the search query associated with the alert, and a time parameter associated with the instance of the alert (e.g., the time parameter specifying what data was searched that resulted in triggering of the alert instance, where the data is time-stamped). The time parameter may define an absolute (e.g., POSIX) time of executing a search query associated with a real-time or a scheduled alert, or a time window for a rolling window alert. For a given alert instance, the system may also store the trigger condition, where this is needed to reproduce the results that resulted in the alert instance. In various illustrative examples, the storage memory may be provided by a file system or by a raw device-based storage.

Figure 2:
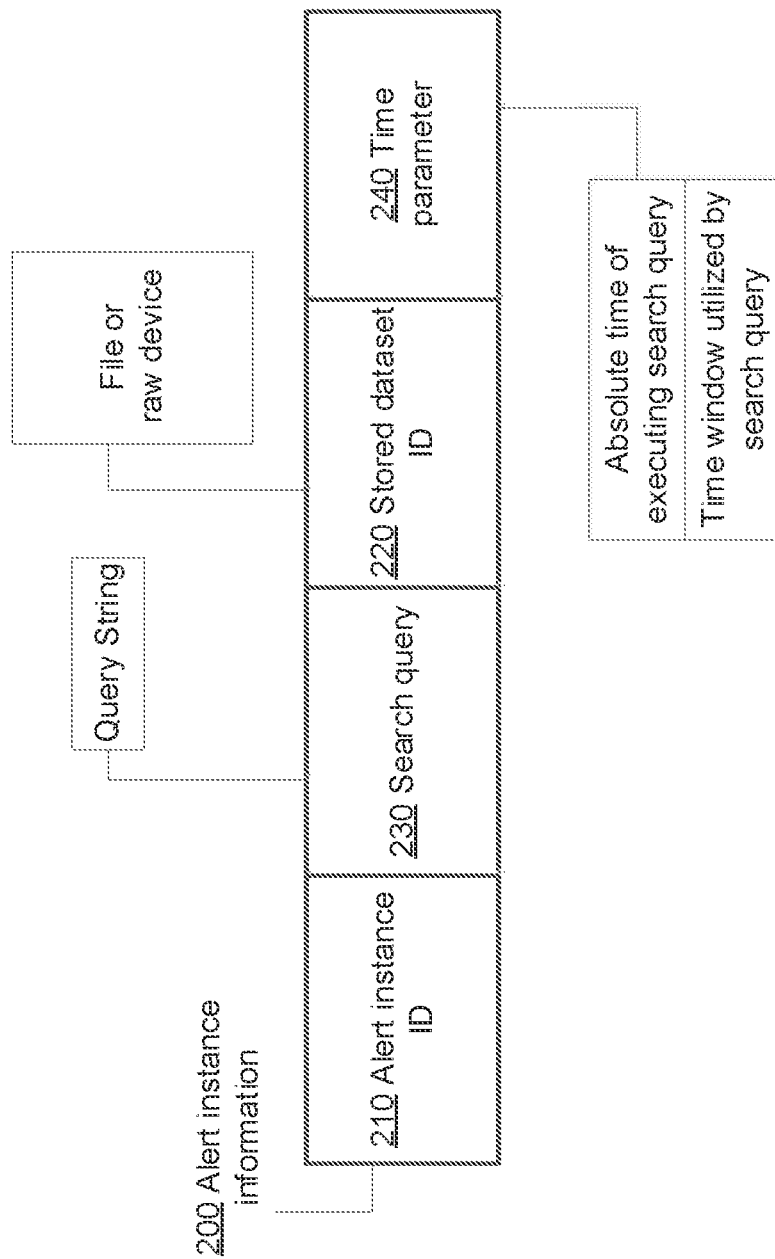
FIG. 2 schematically illustrates an example data structure that may be utilized by the systems and methods described herein for storing the search query, dataset, and a time parameter associated with an alert instance, in accordance with one or more aspects of the present disclosure.

The system may associate, e.g., by a memory data structure, an identifier of the alert instance with the portion of the dataset stored in the memory, the search query, and the time parameter. FIG. 2 schematically illustrates an example data structure that may be utilized by the systems and methods described herein for storing the search query, dataset, and a time parameter associated with an alert instance, in accordance with one or more aspects of the present disclosure. As schematically illustrated by FIG. 2, memory data structure 200 may map an alert instance identifier 210 to an identifier 220 of the portion of the dataset stored in the memory, the search query 230 utilized to produce the dataset, and the time parameter 240 associated with the alert instance.

In certain implementations, the system may implement a file retention policy with respect to various files, including the files containing datasets associated with alert instances. In an illustrative example, a file may be deleted upon expiration of a certain time (e.g., 24 hours) since the time of the file creation. Alternatively, one or more least recently created, accessed or modified files may be deleted responsive to determining that the free disk space falls below a certain threshold value.

At any time after an alert instance has been triggered, a user may request (e.g., via a GUI associated with the client computing device), the portion of the dataset that has triggered the alert instance. Responsive to receiving the request, the system may determine whether the portion of the dataset is stored in the storage memory. In an illustrative example, the system may determine an identifier of the portion of the dataset by looking up the identifier of the alert instance in the memory data structure 200. Responsive to determining that the portion of the dataset is stored in the storage memory, the system may retrieve the portion of the dataset from the storage memory and transmit a message comprising the portion of the dataset to the client computing device. Otherwise, responsive to determining that the portion of the dataset is not stored in the storage memory, the system may identify the search query and the time parameter associated with the alert instance, by looking up the identifier of the alert instance in the memory data structure 200. The system may then re-create the portion of the dataset by executing the search query using the time parameter associated with the alert instance. In certain implementations, the time parameter may define a point in time (e.g., using POSIX time represented by number of seconds that have elapsed since 00:00:00 Coordinated Universal Time (UTC), Thursday, 1 Jan. 1970) of executing a search query that has triggered the alert instance. The time parameter may also define a time range associated with the search query that has triggered the alert instance.

In an illustrative example, for a rolling window alert, the system may substitute, in the definition of the time range utilized by the search query, the "current time" moment with the value of the time parameter associated with the alert instance, where the time parameter represents the point in time of executing the search query that has triggered the alert instance. For example, if a query associated with a rolling window alert defined on a one-hour rolling window was executed at 09:00 UTC, Jan. 1, 2014, the system may re-create the portion of the dataset that has triggered the alert instance, by re-executing the search query with a filtering condition to only select data items having timestamps falling within the time range between 08:00 and 09:00 UTC, Jan. 1, 2014.

In another illustrative example, for a scheduled alert, the system may substitute the definition of the time range utilized by the search query with the value of the time parameter associated with the alert instance, where the time parameter represents the time range associated with the alert instance, as described in more details herein above. For example, the system may re-create the portion of the dataset that has triggered the alert instance, by re-executing the search query with a filtering condition to only select data items having timestamps falling within the time range between 12:00 and 13:00 UTC, Jan. 1, 2014.

Responsive to re-executing the search query, the system may identify a portion of the resulting dataset that satisfies the triggering condition and transmit a message comprising the portion of the dataset to the client computing device.

In certain implementations, a dataset that has been recreated by the above described procedure responsive to a client request, may be stored in the storage memory subject to the general or a shortened file retention policy.

Figure 3A:
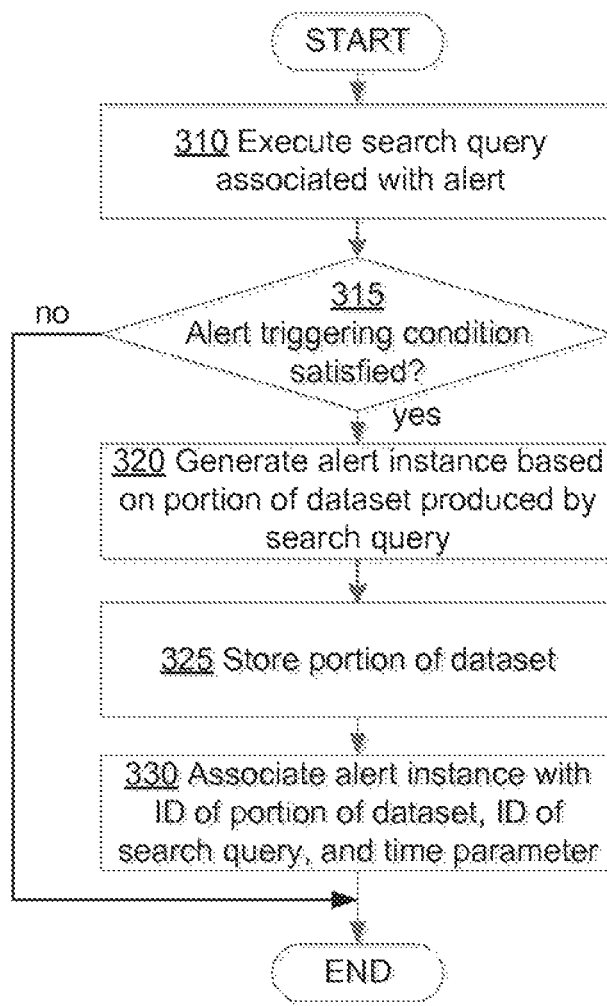
FIGS. 3A-3C depict flow diagrams of example methods 300A-300C for managing datasets produced by alert-triggering search queries, in accordance with one or more aspects of the present disclosure.
Figure 3B:
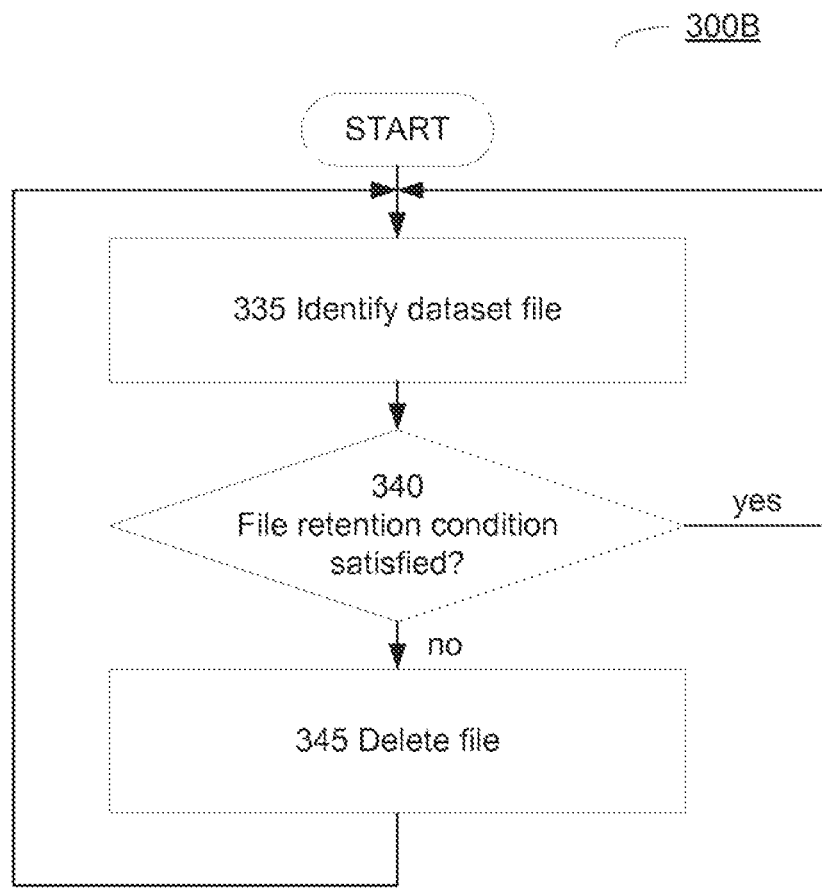
Figure 3C:
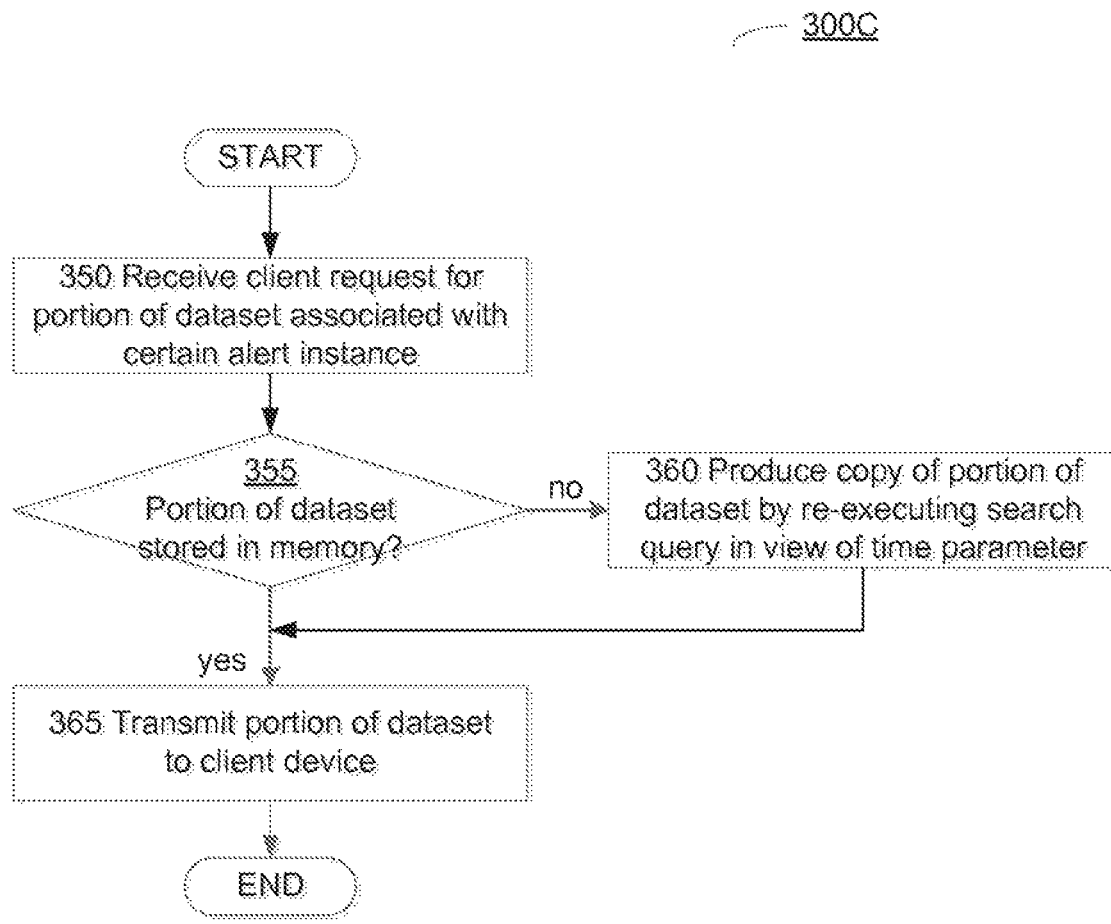

FIGS. 3A-3C depict flow diagrams of example methods 300A-300C for managing datasets produced by alert-triggering search queries. Methods 300A-300C and/or each of their respective individual functions, routines, subroutines, or operations may be performed by one or more general purpose and/or specialized processing devices. Two or more functions, routines, subroutines, or operations of methods 300A-300C may be performed in parallel or in an order that may differ from the order described above. In certain implementations, one or more of methods 300A-300C may be performed by a single processing thread. Alternatively, methods 300A-300C may be performed by two or more processing threads, each thread executing one or more individual functions, routines, subroutines, or operations of the respective method. In an illustrative example, the processing threads implementing methods 300A-300C may be synchronized (e.g., using semaphores, critical sections, and/or other thread synchronization mechanisms). Alternatively, the processing threads implementing methods 300A-300C may be executed asynchronously with respect to each other. In an illustrative example, methods 300A-300C may be performed by an example computing device 1000 described herein below with references to FIG. 9. In another illustrative example, methods 300A-300C may be performed by a distributed computer system comprising two or more example computing devices 1000.

FIG. 3A depict a flow diagram of an example method 300A for storing search queries and time parameters associated with alert instances, in accordance with one or more aspects of the present disclosure.

Referring to FIG. 3A, at block 310, the computer system implementing the method may execute a search query. In an illustrative example, the search query may represent a real-time search (e.g., may repeatedly be executed by a certain process or thread in an indefinite loop which may be interrupted by occurrences of certain terminating conditions). In an illustrative example, the search query may represent a scheduled search (e.g., may be executed according to a certain schedule), as described in more details herein above.

Responsive to determining, at block 315, that a portion of the dataset produced by the search query satisfies a triggering condition defining an alert associated with the search query, the processing may continue at block 320; otherwise, the processing associated with the current search query instance may terminate.

At block 320, the computer system may generate an alert instance based on at least a portion of the dataset produced by executing the search query.

At block 325, the computer system may store, in a memory associated with the computer system, the portion of the dataset. In various illustrative examples, the storage memory may be provided by a file system or by a raw device-based storage.

At block 330, the computer system may associate, by a memory data structure, the instance of the alert with an identifier of the portion of the dataset, an identifier of the search query, and a time parameter. The time parameter may define a point in time (e.g., using POSIX time) of executing a search query that has triggered the alert instance, and/or a time range associated with the search query that has triggered the alert instance, as described in more details herein above.

The stored portion of the dataset may be subject to a file retention policy implemented by the computer system, e.g., as described herein below with references to FIG. 3B.

FIG. 3B depicts a flow diagram of an example method 300B for implementing a file retention policy with respect to stored datasets, in accordance with one or more aspects of the present disclosure.

Referring to FIG. 3B, at block 335, the computer system implementing the method may identify a file storing a dataset (e.g., by cycling through a plurality of stored datasets).

At block 340, the computer system may evaluate a file retention condition applied to the identified dataset.

Responsive to determining, at block 340, that the file retention condition for the identified file is satisfied, the method may loop back to block 335. Otherwise, the computer system may, at block 345, delete the identified dataset. In an illustrative example, a file retention policy may require deleting a file upon expiration of a certain time period (e.g., 24 hours) since the time of the file creation, and the computer system can check at block 340 whether the time of the file creation is still within the time period defined by the file retention policy. Alternatively, the file retention policy may require deleting one or more (e.g., a predefined number of) least recently created, accessed or modified files responsive to determining that the free disk space falls below a certain threshold value, and the computer system can check at block 340 whether the file is not one of the least recently created, accessed or modified files.

As noted herein above, in certain implementations, the file retention policy may be implemented by a dedicated processing device and/or dedicated processing thread operating asynchronously with respect to other operations comprised by method 300.

FIG. 3C depicts a flow diagram of an example method 300C for processing client requests for datasets associated with alert instances, in accordance with one or more aspects of the present disclosure.

Referring to FIG. 3C, at block 350, the computer system implementing the method may receive, from a client computing device, a request for the portion of the dataset associated with a certain alert instance identified by the request.

Responsive to determining, at block 355, that the portion of the dataset is stored in the storage memory, the processing may continue at block 365; otherwise, the method may branch to block 360.

At block 360, the computer system may identify, using the above referenced memory data structure, the search query utilized for producing the portion of the dataset that has triggered the alert instance identified by the client request, and the time parameter associated with the search query. The computer system may produce a copy of the portion of the dataset by re-executing the search query in view of the time parameter.

In an illustrative example, for a rolling window alert, the system may substitute, in the definition of the time range utilized by the search query, the "current time" moment with the value of the time parameter associated with the alert instance, where the time parameter represents the point in time of executing the search query that has triggered the alert instance. In another illustrative example, for a scheduled alert, the system may substitute the definition of the time range utilized by the search query with the value of the time parameter associated with the alert instance, where the time parameter represents the time range associated with the alert instance, as described in more details herein above.

At block 365, the computer system may transmit the copy of the portion of the dataset to the client computing device. Responsive to completing operations referenced by the block 365, processing associated with the current search query instance may terminate.

The systems and methods described herein above may be employed by various data processing systems, e.g., data aggregation and analysis systems. In various illustrative examples, the data processing system may be represented by the SPLUNK® ENTERPRISE system produced by Splunk Inc. of San Francisco, California, to store and process performance data.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, California, to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in database fields or data items stored in fields in a data structure defined by a computer program. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from web logs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a "tag" may be assigned to two or more fields that contain equivalent data items, even though the fields are associated with different events and possibly different extraction rules. By enabling a single tag (e.g., a field name) to be used to identify equivalent fields from different types of events generated by different data sources, the system facilitates use of a "common information model" (CIM) across the different data sources.

Figure 4:
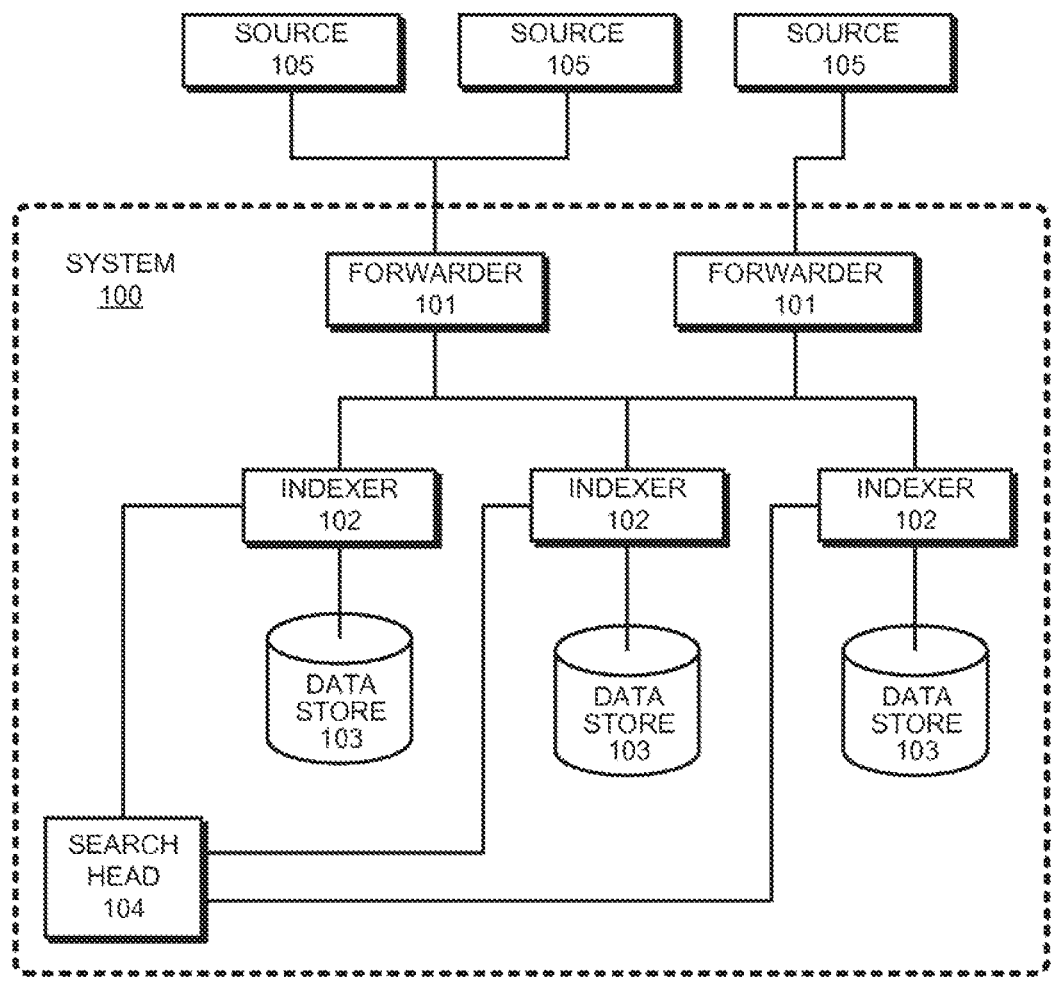
FIG. 4 presents a block diagram of an event-processing system in accordance with the disclosed embodiments.

FIG. 4 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Also, certain forwarders 101, referred to as "heavy forwarders," can perform operations to strip extraneous data and detect timestamps for the data. (In contrast, normal forwarders do not perform such operations as stripping extraneous data and detecting timestamps.) Based on the detected timestamps, the heavy forwarders can index and group the data into buckets that fall within a common time range. The heavy forwarders next determine which indexers 102 will receive each bucket of data and then forward the data to these indexers 102.

Note that distributing buckets for different time ranges across different indexers facilitates parallel processing. This parallel processing can take place at data ingestion time, because multiple indexers can process incoming data for different time ranges in parallel. The parallel processing can also take place at search time, because multiple indexers can perform searches for different time ranges in parallel while processing a query.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Figure 5:
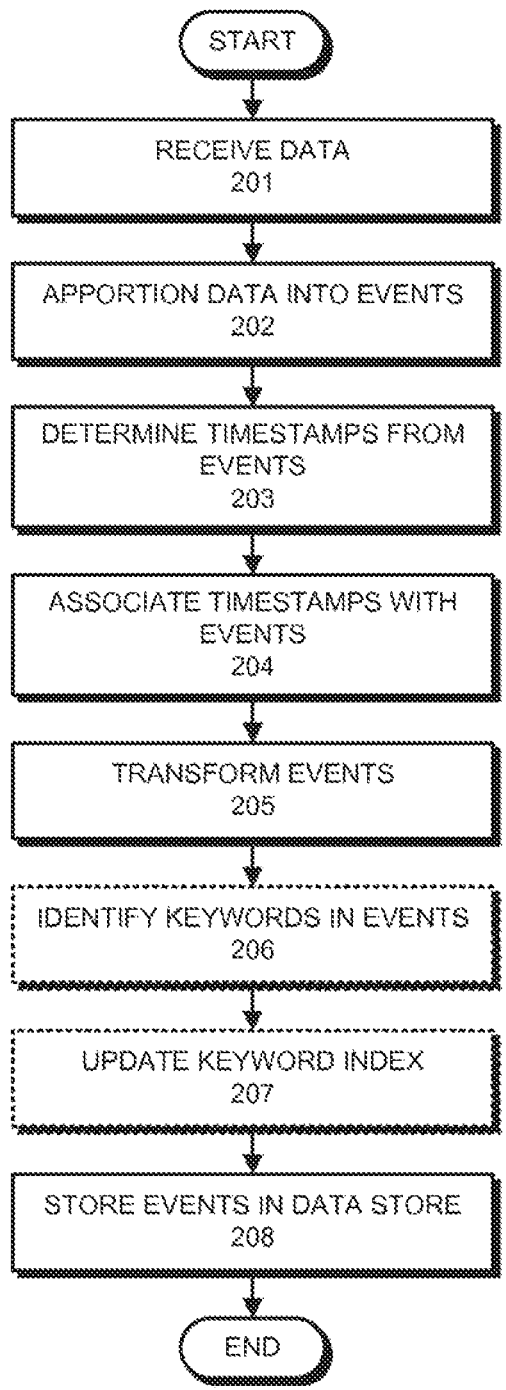
FIG. 5 presents a flowchart illustrating how indexers process, index, and store data received from forwarders in accordance with the disclosed embodiments.

FIG. 5 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

Figure 6:
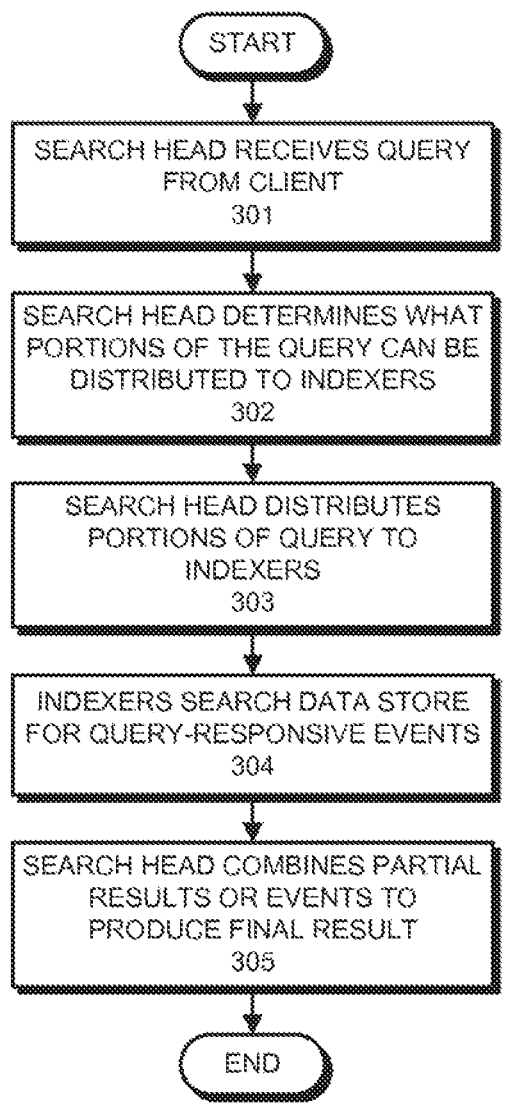
FIG. 6 presents a flowchart illustrating how a search head and indexers perform a search query in accordance with the disclosed embodiments.

FIG. 6 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions should be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. These criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or can use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events should include. Next, the search head can use these parameters to query the indexers to obtain a superset of the eventual results. Then, during a filtering stage, the search head can perform field-extraction operations on the superset to produce a reduced set of search results.

Figure 7:
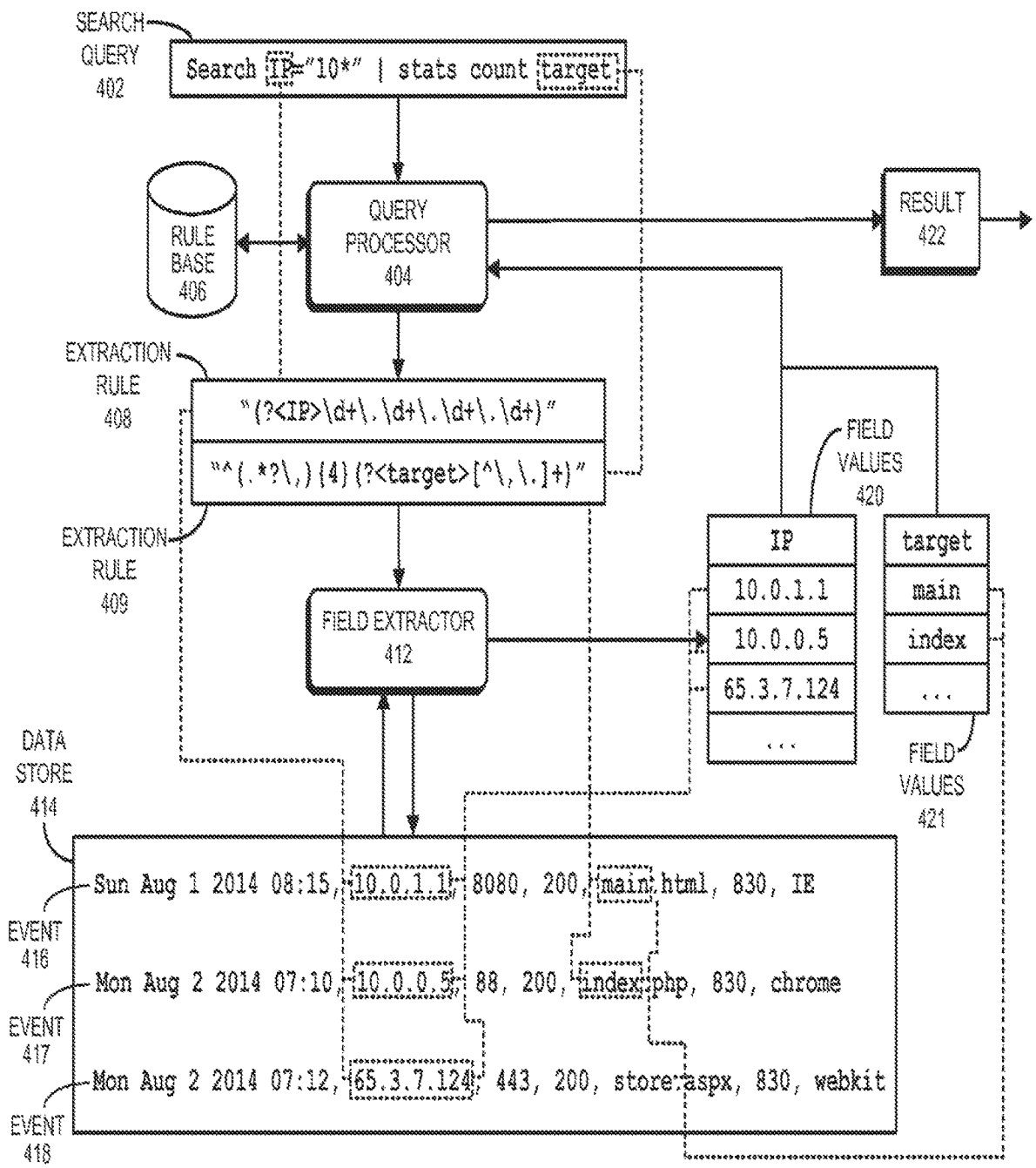
FIG. 7 presents a block diagram of a system for processing search requests that uses extraction rules for field values in accordance with the disclosed embodiments.

FIG. 7 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 7 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 7, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 7. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of target fields that were read, which in this example produces the value "2" that is returned as a final result 422 for the query.

Note that query results can be returned to a client, or to a search head, or to any other system component for further processing. In general, query results may include a set of one or more values obtained from events in data store 414; a subset of the values; statistics calculated based on the values; a report containing the values; or a visualization, such as a graph or chart, generated from the values.

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing analysis operations at search time can involve a large amount of data and require a large number of computational operations, which can cause considerable delays while processing the queries. Fortunately, a number of acceleration techniques have been developed to speed up analysis operations performed at search time. These techniques include: (1) using a keyword index; (2) performing search operations in parallel by formulating a search as a map-reduce computation; (3) using a high performance analytics store; and (4) accelerating the process of generating reports. These techniques are described in more detail below.

As described above with reference to the flow charts in FIGS. 5 and 6, event-processing system 100 can construct and maintain one or more keyword indices to facilitate rapidly identifying events containing specific keywords. This can greatly speed up the processing of queries involving specific keywords.

To facilitate faster query processing, a query can be structured as a map-reduce computation, wherein the "map" operations are delegated to the indexers, while the corresponding "reduce" operations are performed locally at the search head. For example, FIG. 8 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 8, or may alternatively distribute a modified version (e.g., a more restricted version) of the search query to the search peers. In this example, the indexers are responsible for counting the results and sending them to the search head. After the indexers return the results to the search head, the search head performs the merging operations 503 on the results. Note that by executing the computation in this way, the system effectively distributes the computational operations while minimizing data transfers.

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this situation, the system can use the summarization tables to obtain partial results for the events that are covered by summarization tables, but may also have to search other events that are not covered by the summarization tables. These partial results and results obtained by searching the other events can then be combined to produce a final set of results for the query. This summarization table and associated techniques are described in more detail in U.S. Pat. No. 8,682,925, issued on Mar. 25, 2014.

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

Figure 9:
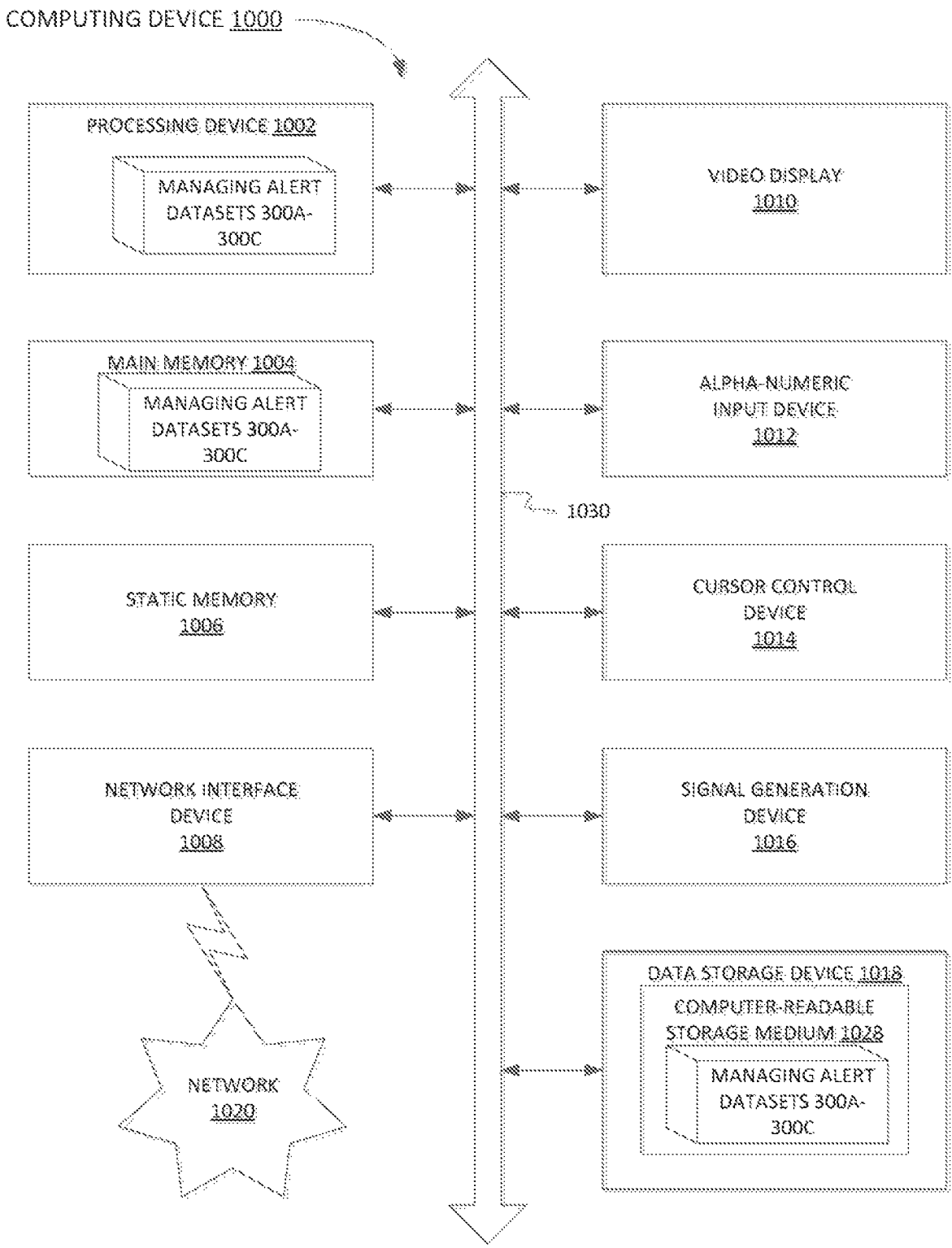
FIG. 9 depicts a block diagram of an example computing device operating in accordance with one or more aspects of the present disclosure.

FIG. 9 illustrates a diagrammatic representation of a computing device 1000 within which a set of instructions for causing the computing device to perform the methods discussed herein may be executed. The computing device 1000 may be connected to other computing devices in a LAN, an intranet, an extranet, and/or the Internet. The computing device 1000 may operate in the capacity of a server machine in client-server network environment. The computing device 1000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computing device 1000 may implement the above described methods 300A-300C for managing datasets produced by alert-triggering search queries.

The example computing device 1000 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the methods 300A-300C for managing datasets produced by alert-triggering search queries, in accordance with one or more aspects of the present disclosure.

The computing device 1000 may further include a network interface device 1008, which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the methods 300A-300C for managing datasets produced by alert-triggering search queries, in accordance with one or more aspects of the present disclosure) implementing any one or more of the methods or functions described herein. Instructions implementing methods 300A-300C may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method performed by one or more processing devices, the method comprising:
executing a search query on a portion of searchable data specified by a time window defined relative to a current time, to produce a dataset comprising one or more results;
determining that a portion of the dataset satisfies a triggering condition defining an alert associated with the search query;
generating, based on the triggering condition being satisfied, an instance of the alert;
associating, using a memory data structure, the instance of the alert with an identifier of the search query and a time parameter specifying a time of execution of the search query that has triggered the instance of the alert;
receiving, from a client computing device, a request for the portion of the dataset; and
reproducing the portion of the dataset that satisfies the triggering condition defining the alert by re-executing the search query, modified via a system component, including a filtering condition that substitutes the time window defined relative to the current time with the time window defined relative to the time parameter specifying the time of execution of the search query that triggered the instance of the alert, the time parameter identified via the memory data structure.

2. The method of claim 1, further comprising:
storing the portion of the dataset and an association of the stored portion of the dataset with the instance of the alert.

3. The method of claim 1, further comprising:
implementing a file retention policy with respect to datasets stored in memory, wherein the file retention policy requires deleting certain datasets responsive to evaluating corresponding file retention conditions.

4. The method of claim 1, further comprising:
transmitting a copy of the portion of the dataset to the client computing device.

5. The method of claim 1, further comprising associating the instance of the alert with an identifier of the triggering condition.

6. The method of claim 1, wherein the searchable data comprises time-stamped events having portions of raw machine data.

7. The method of claim 1, further comprising:
transmitting, to the client computing device, a notification of the instance of the alert.

8. The method of claim 1, wherein the client computing device comprises at least one of: a desktop computing device or a mobile computing device.

9. The method of claim 1, wherein executing the search query on the portion of searchable data further comprises: applying a late binding schema to the searchable data, the late binding schema associated with one or more extraction rules defining one or more fields.

10. The method of claim 1, wherein the portion of searchable data comprises machine data generated by at least one of a server, a database, an application, or a network.

11. The method of claim 1, wherein the search query is executed based on a schedule that is associated with the alert.

12. The method of claim 1, wherein the triggering condition requires that the portion of the dataset comprise a predetermined number of results.

13. The method of claim 1, further comprising:
performing an action associated with the alert, wherein the action comprises at least one of: sending an electronic mail message, creating a Really Simple Syndication (RSS) feed, or executing a script.

14. The method of claim 1, further comprising:
causing the instance of the alert to be displayed via a graphical user interface (GUI).

15. A computer system comprising:
a memory; and
one or more processing devices, coupled to the memory, to:
execute a search query on a portion of searchable data specified by a time window defined relative to a current time, to produce a dataset comprising one or more results;
determine that a portion of the dataset satisfies a triggering condition defining an alert associated with the search query;
generate, based on the triggering condition being satisfied, an instance of the alert;
associate, using a memory data structure, the instance of the alert with an identifier of the search query and a time parameter specifying a time of execution of the search query that has triggered the instance of the alert;
receive, from a client computing device, a request for the portion of the dataset; and
reproduce the portion of the dataset that satisfies the triggering condition defining the alert by re-executing the search query, modified via a system component, including a filtering condition that substitutes the time window defined relative to the current time with the time window defined relative to the time parameter specifying the time of execution of the search query that triggered the instance of the alert, the time parameter identified via the memory data structure.

16. The computer system of claim 15, wherein the searchable data comprises time-stamped events having portions of raw machine data.

17. The computer system of claim 15, wherein executing the search query on the portion of searchable data further comprises: applying a late binding schema to the searchable data, the late binding schema associated with one or more extraction rules defining one or more fields.

18. A computer-readable non-transitory storage medium comprising executable instructions that, when executed by a computer system, cause the computer system to:
execute a search query on a portion of searchable data specified by a time window defined relative to a current time, to produce a dataset comprising one or more results;
determine that a portion of the dataset satisfies a triggering condition defining an alert associated with the search query;
generate, based on the triggering condition being satisfied, an instance of the alert;
associate, using a memory data structure, the instance of the alert with an identifier of the search query and a time parameter specifying a time of execution of the search query that has triggered the instance of the alert;
receive, from a client computing device, a request for the portion of the dataset; and
reproduce the portion of the dataset that satisfies the triggering condition defining the alert by re-executing the search query, modified via a system component, including a filtering condition that substitutes the time window defined relative to the current time with the time window defined relative to the time parameter specifying the time of execution of the search query that triggered the instance of the alert, the time parameter identified via the memory data structure.

19. The computer-readable non-transitory storage medium of claim 18, wherein the searchable data comprises time-stamped events having portions of raw machine data.

20. The computer-readable non-transitory storage medium of claim 18, wherein executing the search query on the portion of searchable data further comprises: applying a late binding schema to the searchable data, the late binding schema associated with one or more extraction rules defining one or more fields.

* * * * *